(12) United States Patent
White et al.

(10) Patent No.: US 6,981,720 B2
(45) Date of Patent: Jan. 3, 2006

(54) TAPERED CERAMIC GC FITTING AND ASSEMBLY

(75) Inventors: Richard P. White, Glen Mills, PA (US); Alan D. Loux, Newark, DE (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/702,583

(22) Filed: Nov. 7, 2003

(65) Prior Publication Data

US 2005/0099006 A1   May 12, 2005

(51) Int. Cl.
*F16L 17/00* (2006.01)
(52) U.S. Cl. ............... 285/332.1; 285/342; 285/334.4
(58) Field of Classification Search ............... 285/342, 285/332.1, 332, 334.4, 279
See application file for complete search history.

(56) References Cited

U.S. PATENT DOCUMENTS

| | | | |
|---|---|---|---|
| 4,163,722 A * | 8/1979 | Cosentino et al. ........... 210/236 |
| 4,529,230 A * | 7/1985 | Fatula, Jr. .................... 285/341 |
| 4,655,917 A * | 4/1987 | Shackelford et al. ..... 210/198.2 |
| 4,787,656 A * | 11/1988 | Ryder ....................... 285/334.3 |
| 4,969,938 A * | 11/1990 | America ....................... 96/105 |
| 4,991,883 A * | 2/1991 | Worden .................... 285/334.4 |
| 5,234,235 A * | 8/1993 | Worden .................... 285/334.4 |
| 5,288,113 A | 2/1994 | Silvis et al. |
| 5,310,029 A * | 5/1994 | Kujawski ..................... 285/342 |
| 5,487,569 A * | 1/1996 | Silvis et al. ................. 285/342 |
| 5,540,464 A * | 7/1996 | Picha .......................... 285/328 |
| 5,595,406 A * | 1/1997 | Warchol ..................... 285/319 |
| 5,601,785 A | 2/1997 | Higdon |
| 6,102,449 A * | 8/2000 | Welsh ......................... 285/342 |
| 6,709,027 B2 * | 3/2004 | Rittenhouse ................ 285/332 |

* cited by examiner

*Primary Examiner*—David Bochna

(57) ABSTRACT

The present invention is a ferrule for gas chromatography fittings comprising a body having a first end, a second end, and an internal bore extending length of the body; a tip integral with the body and protruding from the first end is disclosed. The tip has a flat surface through which the internal bore extends and wherein the flat surface of the tip is of smaller area than the first end and is perpendicular to the body. In one embodiment the body of the ferrule is formed from Zirconia ceramic. A connector assembly for creating a gas seal between chromatographic tubing is also disclosed.

13 Claims, 4 Drawing Sheets

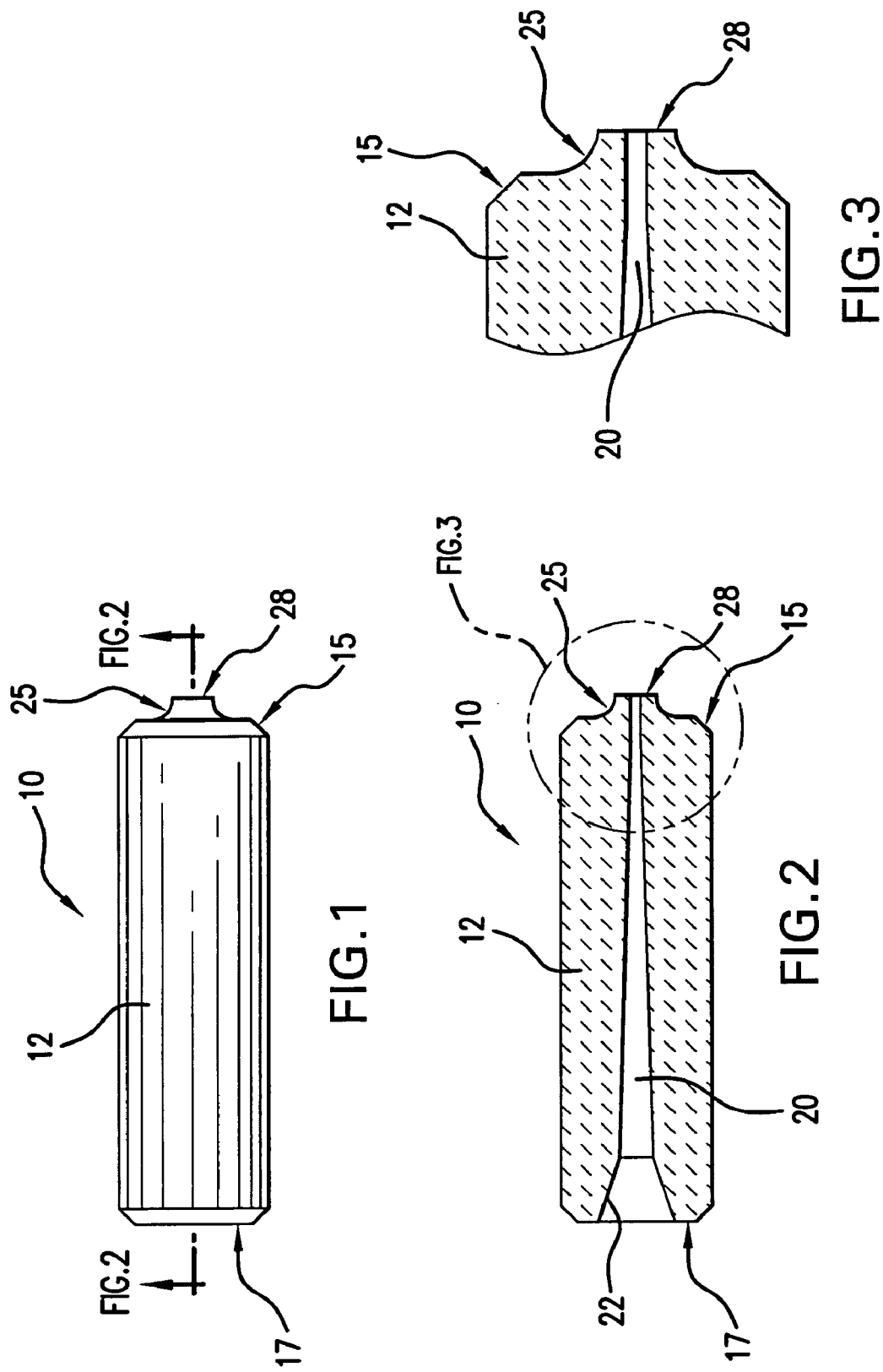

TAPERED CERAMIC GC FITTING AND ASSEMBLY

FIELD OF THE INVENTION

The present invention relates to fittings for gas chromatography tubing.

BACKGROUND OF THE INVENTION

In GC, capillary columns need to be joined to various devices, such as injectors, detectors, and other column or tubing ends. Particularly in capillary chromatography, managing the volumes, flow rates, and geometries between devices has a critical effect on maintaining peak shape quality. There is a need for a union connector assembly that provides zero or near zero dead volume for GC columns.

Previous attempts to provide this type of union have produced connectors that are either too complex in terms of their operation, too large and bulky to be useful in smaller areas, or too unreliable in terms of their performance. Examples of such fitting are found in U.S. Pat. No. 5,540,464 and U.S. Pat. No. 5,288,113. The fittings disclosed in these references are especially unsuitable for use in the smaller ovens utilized in Micro Gas Chromatography (Micro GC).

Another common zero dead volume union which provide acceptable chromatographic performance is the tapered glass press fit union. This type of union, however, has certain drawbacks as well. The reliability of the tapered glass press fit union is inconsistent with temperature range cycling. Additionally, the integrity of the connection around bends is limited. Finally, this type of connector is not reusable.

The term Micro GC refers to a type of chromatography that is performed on an instrument that is smaller than a standard gas chromatograph. Typically in a Micro-GC, the column is coiled to 57 mm ID, and is positioned in an oven that is only 110 mm tall. The size of the connector assembly is a significant consideration in Micro GC. Previous connectors are too large or bulky to be practical for use in this size machine. There is a need for a zero or near zero dead volume connector assembly that is simple and reusable, There is a need for a connector assembly that is less bulky and more compact for smaller chromatographs, and one that provides a secure connection for straight or bent tubing.

SUMMARY OF THE INVENTION

A ferrule for gas chromatography fittings comprising a body having a first end, a second end, and an internal bore extending length of the body; a tip integral with the body and protruding from the first end is disclosed. The tip has a flat surface through which the internal bore extends and wherein the flat surface of the tip is of smaller area than the first end and is perpendicular to the body outer diameter.

BRIEF DESCRIPTION OF THE DRAWINGS

The accompanying drawings are incorporated in and constitute a part of this specification and, together with the description, explain the advantages and principles of the invention. In the drawings, FIG. 1 is a plan view of a ceramic ferrule of the present invention;

FIG. 2 is a sectional view of a ceramic ferrule of the present invention;

FIG. 3 is an enlarged view of the tip of a ceramic ferrule;

DETAILED DESCRIPTION OF PREFERRED EMBODIMENTS

Figure 4:
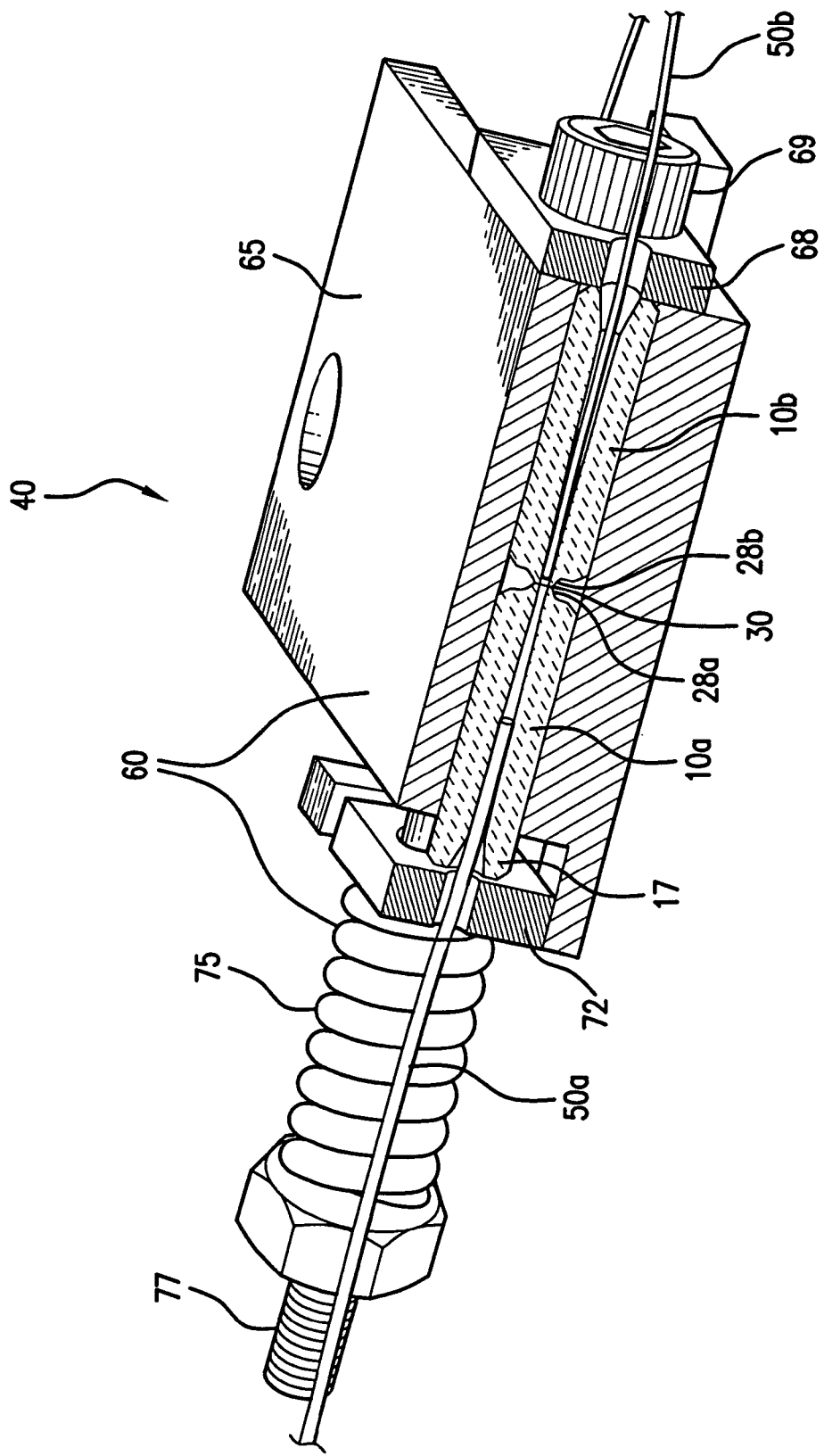
FIG. 4 is a sectional view of a connector assembly of one embodiment of the present invention connecting the ends of two chromatographic tubings.

Turning now to the drawings, FIGS. 1 and 2 illustrate the preferred embodiment of the ceramic ferrule of the invention. The ceramic ferrule 10 has a main body 12. The main body is preferably cylindrical, but need not be. The ceramic ferrule 10 has two ends, a first end 15 and a second end 17. The ferrule 10 is preferably formed from a ceramic material and most preferably from Zirconia. Other materials may also be used depending on the application. Factors to be considered when choosing ferule material include the chemical inertness of the material, the effect of temperature on the material, the ability of the material to be fabricated with the precision required of the ferrule, and the polish capability of the material. Examples of such materials without limitation include glass, fused silica, and some plastics.

Protruding from the first end 15 is tip 25. The tip 25 is integrally connected to the first end 15 and is preferably fabricated from the same molded material and in the same process as the body 15 of the ferrule. The preferred method of constructing the body 15 with the integrally connected tip 25 is by ceramic injection molding. Once cast, the tip 25 is ground to final shape. The tip has a flat surface or face 28 that is substantially parallel to the first end 15 and perpendicular to the body outer diameter. The diameter of the tip is preferable less than 0.7 mm. The face 28 is polished by flat lapping to produce a smooth, substantially flat surface. In some embodiments of the invention the face 28 will interface with a second face 28 from a second ferrule 10. In those instances a smoother surface is desired to more easily achieve a gas tight seal. In the preferred embodiment the final geometry and finish on the ferrule tip is produced by lapping. Lapping refers to a specific kind of machine for producing a smooth flat surface using a rotating plate charged with appropriate particles. It is a specific kind of polishing, though polishing usually involves fine abrasive materials bonded to some backing. Lapping is slow and time consuming, but produces the desired surface characteristics of flatness, perpendicularity, and optically smooth finish.

The ferrule 10 has an internal bore 20 extending the entire length of the ferrule 10, including the tip 25 and the face 28. The bore 20 is cylindrical in shape and is preferably conical with the wider portion beginning at the second end 17 and narrowing as it progresses toward the first end 15. Preferably, the bore has an internal taper of about 2.5 degrees. When tapered in this manner, a stronger primary gas seal between the outside of the tubing and the surface of the internal bore 20 is more easily created. Additionally, when tapered at this angle the bore is able to accommodate a larger variety of sized tubings.

Chromatographic tubing typically refers to chromatography columns, however, other types of tubing may be used such as stainless steel tubing. This invention is equally applicable to all types of chromatography tubing and any reference to a column or columns in this specification refers to all types of chromatographic tubing unless otherwise noted. Typical chromatographic tubing for Micro GC is coiled and has an internal diameter of 57 mm and fits in an oven that is 110 mm tall. A ferrule 10 with about a 2.5 degree taper will accommodate tubing within a range of 430 micron outer diameter down to 90 micron outer diameter. Of course, the dimensions of the ferrule and internal bore can be adjusted to fit a much broader range of tubing sizes.

As the ferrule 10 will typically receive some form chromatographic tubing, the precise dimensions of the bore 20 will depend on the outer diameter of the tubing being inserted. Additionally, it is preferred that the opening 22 at the second end 17 be flared out to assist in the ease of the insertion of the tubing. Additionally, the flared opening will assist in installation of backup adhesive and can provide strain relief to ease the transition from the ferrule constraints to the coiled column. The preferred angle of the flare is about 30 degrees, but other angles may be used.

In use, a chromatographic tubing is inserted into the second end 17 of the ferrule 10 and pressed inwards until a friction fit is created. Fused silica chromatographic tubing is coated with polyimide to improve lifetime. The polyimide coating provides the primary seal. The outside surface of the tubing will slightly deform creating the primary gas tight seal between the outside of the tubing and the inside surface of the internal bore 20 of the ferrule. Typically, some form of adhesive is applied to the outside of the tubing creating a secondary seal and strain relief. This secondary seal provides mechanical stability to prevent disruption of the seal due to stress from vibration or pressure if the tubing is wound in a tight coil, as is often the case in a Micro-GC.

The internal bore 20 extends the length of the ferrule 10. As best illustrated in FIG. 3, the internal bore exits through the face 28 of the tip 25. The face 28 of the tip 25 is substantially perpendicular to the main body 12 of the ferrule 10. It is at this area, face 28, that in some embodiments, two ferrules 10 will interface to create a gas tight seal.

Referring to FIG. 4, the ends of two chromatographic tubings 50a and 50b are connected by a connector assembly 40 of the current invention. The connector assembly 40 consists of two ferrules 10a and 10b and a clamping mechanism generally indicated at 60. As discussed above, the union between two ferrules 10a and 10b occurs by positioning the two ferrules in a face 28a to face 28b interface 30 and applying enough force to create a gas tight seal. The clamping mechanism 60 is designed and constructed to secure the two ferrules 10a and 10b in the position and apply the appropriate force. Generally the amount of force needed to create the seal is around 6 lbs. More or less may be needed depending on the smoothness and precise shape of the faces 28a and 28b and the material used to construct the ferrules. The design of the clamping mechanism 60 is less bulky and requires less space than previous unions making it more suitable for the small spaces of a Micro GC.

The clamping mechanism 60 has a frame 65 which secures the ferrules 10a and 10b in place. The frame 65 has a fixed plate 68 at one end with a screw 69 for securing the fixed plate 68 in place. The fixed plate 68 has an aperture or slot for allowing the chromatographic tubing 50b to be installed with the attached ferrule. At the other end, a floating plate 72 is movably attached to the frame 65 to provide force to the second end 17 of the second ferrule 10a. The floating plate 72 also has an aperture or slot for allowing the second chromatographic tubing 50a to be threaded through and into the ferrule 10a. The floating plate can be unloaded or disarmed for easy insertion of the two column/ferrule ends, and subsequently loaded to create the seal.

The floating plate 72 is forced axially towards the frame by an axial spring 75. The axial spring 75 is connected to the frame by a screw 77 that extends through the spring 75 and the floating plate 72. By turning the screw 77 the amount of force being applied to the floating plate 72 can be adjusted., thereby adjusting the amount of force being applied to the ferrules 10a and 10b at the interface 30.

Figure 5:
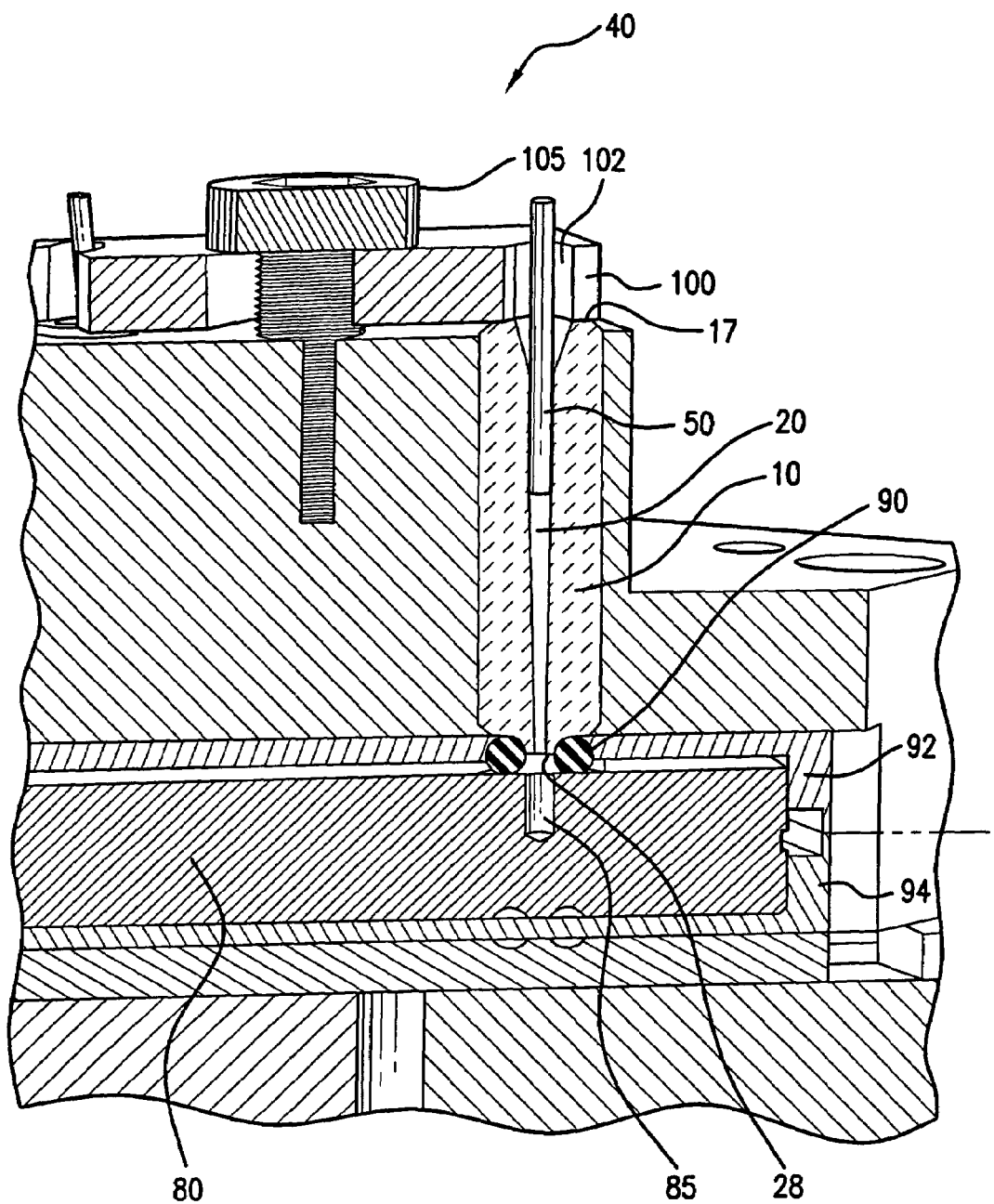
FIG. 5 is a sectional view of a connector assembly of one embodiment of the present invention connecting the end of a chromatography tubing to a planar device.

Referring now to FIG. 5, the end of a chromatographic tubing is connected to a planar device. The reference to a planar device refers to such typical chromatographic equipment as injectors, detectors and manifolds. It is not meant to be limited in its application, but simply refers to a connection that is other than a column to column union.

The planar device is generally represented by 80. The planar device has an entry aperture 85 through which gas (not shown) enters the device 80. The connector assembly 40 in this configuration contains a ferrule 10 and a clamping mechanism 100. As in the previous devices, the column or tubing is inserted into the internal bore 20 of the ferrule 10 via the second end 17.

The ferrule 10 preferably interfaces with the planar device 80 through the use of an elastomer 90. The tip of ferrule 10 is preferably dimensioned to fit with a standard sized o-ring, such as a 2-001 sized o-ring. Alternatively the elastomer may be cut or molded specifically to match the dimensions of the ferrule 10 and the dimensions of the planar device 80.

The connector assembly 40 has a clamping mechanism 100 for securing the ferrule 10 in place and is constructed to position the face 28 of the ferrule 10 in alignment with the aperture 85 of the planar device 80. The connector assembly also functions to provide axial force in the direction of the face 28 to create a gas tight seal at the interface.

Figure 6:
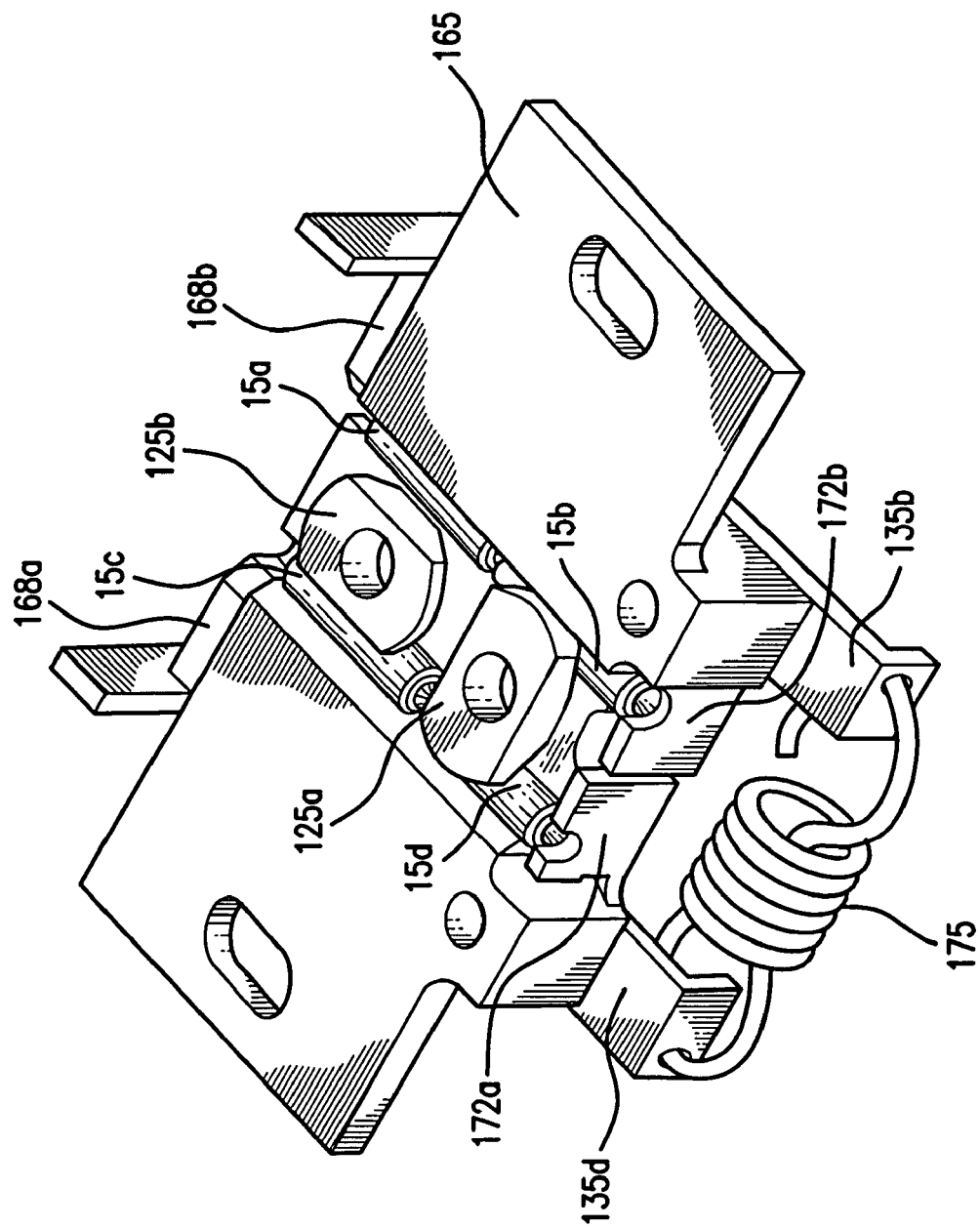
FIG. 6 is a perspective view of a connector assembly of a second embodiment of the present invention connecting the ends of two sets of chromatographic tubings.

Referring now to FIG. 6, an alternate embodiment assembly for joining chromatographic tubing is disclosed. The assembly is designed to connect two different sets of two chromatographic tubings (not shown) in one assembly. Ceramic ferules 15a, 15b, 15c, and 15d are secured within the frame 165. As in FIG. 4. ferules 15a and 15b are secured in a face 28a to face 28b interface. Additionally, ferrules 15c and 15d may also be secured in face 28c to face 28d interface. Ferrules 15a and 15b are secured within the frame 65 by anchor 125b and ferrules 15c and 15d are secured within frame 65 with anchor 125a.

Once in place, force is applied to the ferrules by the use of a spring 175. Ferrules 15a and 15c are held in stationary position by fixed plates 168a and 168b. Floating plates 172a and 172b provide axial force to ferrules 15b and 15d as a result of spring 175. Although not positioned axially, spring 175 provides axial force to floating plates 172a and 172b. A set of pliers 135a and 135b is movably connected to the frame 165 and floating plates 172a and 172b. As the spring pulls the pliers 135a and 135b together, the force is redirected and leveraged to the floating plates 172a and 172b.

As in the assembly described in FIG. 4, the floating and fixed plates have apertures for allowing ingress and egress of the chromatographic tubing to be connected.

What is claimed is:

1. A connector assembly for creating a gas seal between chromatographic tubing comprising:
    at least one set of two ferrules for receiving the tubing wherein each of the ferrules has a body with a first end, a second end, an internal bore extending the length of the body, and a tip integral with the body and protruding from the first end, wherein the tip has a flat surface through which the internal bore extends and wherein the flat surface of the tip is of a smaller area than the first end and is perpendicular to the body, and wherein the tubing is inserted into the second end; and a clamping mechanism for mating the two or more ferrules in a tip to tip interface, wherein the clamping mechanism has a frame for securing the ferrules in alignment and a spring for applying biasing force to the second end of the ferrules such that a gas seal is created at the interface.

2. The connector assembly of claim 1 wherein the clamping mechanism is constructed to hold two separate sets of two ferules in tip to tip alignment.

3. The connector assembly of claim 1, wherein the body of the ferrules are formed from Zirconia ceramic.

4. The connector assembly of claim 1 wherein the internal bore of the ferrules are tapered in the direction of the first end.

5. The connector assembly of claim 1 wherein the internal bore of at least one of the ferrules is tapered in the amount of 2.5 degrees.

6. The connector assembly of claim 1 wherein the internal bore of at least one of the ferrules is flared at the second end.

7. A connector assembly for creating a gas seal between a chromatographic tubing and a planar device comprising:

an elastomeric member dimensioned to interface between, and directly contact, the planar device and a ferrule tip;

at least one ferrule for receiving the tubing having a body wherein the body has a first end, a second end, an internal bore extending length of the body, and an integral circular tip integral protruding from the first end and radiused to mate with the elastomeric member, wherein the internal bore extends through the tip and the tip has a flat surface through which the internal bore extends, wherein the flat surface of the tip is of smaller area than the first end and is perpendicular to the body, and wherein the tubing is inserted into the second end; and a clamping mechanism for mating the ferrule to the elastomeric member, wherein the clamping mechanism has a frame for securing the ferrule alignment with the elastomeric member to limit clamping deflection against second end of the ferrule such that a gas seal is created at the ferrule to elastomer member interface, and wherein the elastomeric member includes an o-ring form.

8. The connector assembly of claim 7 wherein the clamping mechanism is constructed to hold and interface two separate ferrules with the planar device.

9. The connector assembly of claim 7, wherein the body of the ferrule is formed from Zirconia ceramic.

10. The connector assembly of claim 7 wherein the internal bore of the ferrule is tapered in the direction of the first end.

11. The connector assembly of claim 7 wherein the internal bore of the ferrule is tapered in the amount of 2.5 degrees.

12. The connector assembly of claim 7 wherein the internal bore of the ferrule is flared at the second end.

13. The connector assembly of claim 7 wherein the planar device is a MEMS injector.

* * * * *

UNITED STATES PATENT AND TRADEMARK OFFICE
CERTIFICATE OF CORRECTION

PATENT NO. : 6,981,720 B2  Page 1 of 1
APPLICATION NO. : 10/702583
DATED : January 3, 2006
INVENTOR(S) : White et al.

It is certified that error appears in the above-identified patent and that said Letters Patent is hereby corrected as shown below:

On the face page, in field (75), under "Inventors", in column 1, line 2, delete "DE" and insert -- DA --, therefor.

In column 5, line 11, in Claim 2, delete "ferules" and insert -- ferrules --, therefor.

In column 5, line 28, in Claim 7, after "extending" insert -- the --.

In column 5, line 29, in Claim 7, after "tip" delete "integral".

In column 6, line 8, in Claim 7, after "ferrule" insert -- in --.

In column 6, line 10, in Claim 7, after "against" insert -- the --.

Signed and Sealed this

Fifth Day of June, 2007

JON W. DUDAS
*Director of the United States Patent and Trademark Office*